United States Patent
Loi

(10) Patent No.: US 9,097,789 B2
(45) Date of Patent: Aug. 4, 2015

(54) APPARATUS AND METHOD FOR ELECTROMAGNETIC WAVE STRUCTURE MODULATION

(71) Applicant: Duke Loi, Frisco, TX (US)

(72) Inventor: Duke Loi, Frisco, TX (US)

(*) Notice: Subject to any disclaimer, the term of this patent is extended or adjusted under 35 U.S.C. 154(b) by 265 days.

(21) Appl. No.: 13/750,035

(22) Filed: Jan. 25, 2013

(65) Prior Publication Data

US 2013/0241767 A1 Sep. 19, 2013

Related U.S. Application Data

(60) Provisional application No. 61/610,175, filed on Mar. 13, 2012.

(51) Int. Cl.
| | | |
|---|---|---|
| G01S 13/74 | (2006.01) | |
| G01S 13/75 | (2006.01) | |
| H01Q 15/14 | (2006.01) | |
| G01S 7/28 | (2006.01) | |
| H01P 11/00 | (2006.01) | |
| G06K 19/067 | (2006.01) | |

(52) U.S. Cl.
CPC .............. *G01S 7/28* (2013.01); *G06K 19/0672* (2013.01); *H01P 11/001* (2013.01); *G01S 13/74* (2013.01); *G01S 13/75* (2013.01); *G01S 13/751* (2013.01); *H01Q 15/14* (2013.01); *Y10T 29/49018* (2015.01)

(58) Field of Classification Search
CPC .......................................... G01S 13/74–13/767
USPC .......................... 342/27, 28, 42–51, 175, 5, 6
See application file for complete search history.

(56) References Cited

U.S. PATENT DOCUMENTS

| | | | | |
|---|---|---|---|---|
| 4,096,477 | A * | 6/1978 | Epstein et al. ................. | 342/44 |
| 4,725,841 | A * | 2/1988 | Nysen et al. ................... | 342/44 |
| 4,737,790 | A * | 4/1988 | Skeie et al. .................... | 342/51 |
| 5,469,170 | A * | 11/1995 | Mariani ......................... | 342/51 |
| 5,519,565 | A * | 5/1996 | Kalt et al. ..................... | 361/280 |
| 5,955,949 | A * | 9/1999 | Cocita ........................ | 340/572.1 |
| 6,121,892 | A * | 9/2000 | Reindl et al. .................. | 340/5.8 |
| 6,144,332 | A * | 11/2000 | Reindl et al. .................. | 342/42 |
| 6,407,695 | B1 * | 6/2002 | Stierlin et al. ................. | 342/42 |

(Continued)

OTHER PUBLICATIONS

Steven Mahon and Robert Aigner, Bulk Acoustic Wave Devices—Why, How, and Where They Are Going, pp. 15-18, CS Mantech Conference, May 14-17, 2007, Austin, Texas, USA.

(Continued)

*Primary Examiner* — Peter Bythrow
(74) *Attorney, Agent, or Firm* — Andrews Kurth LLP

(57) ABSTRACT

Electromagnetic wave structure modulation apparatus comprises an encoded device that has an electromagnetic wave-transparent material having a three-dimensional volume and electromagnetic wave-opaque walls, and a plurality of electromagnetic wave-opaque projections projecting into the electromagnetic wave-transparent material. The apparatus further comprises an interrogating device that has a transceiver operable to transmit an electromagnetic wave into the electromagnetic wave-transparent material, the electromagnetic wave being modulated and reflected by the electromagnetic wave-opaque walls and projections, an antenna operable to receive the reflected electromagnetic waves, and a decoder operable to decode the received reflected electromagnetic waves.

8 Claims, 1 Drawing Sheet

(56) References Cited

U.S. PATENT DOCUMENTS

| | | | |
|---|---|---|---|
| 6,433,671 B1* | 8/2002 | Nysen | 340/10.41 |
| 6,455,979 B2* | 9/2002 | Reindl et al. | 310/313 D |
| 6,462,698 B2* | 10/2002 | Campbell et al. | 342/51 |
| 6,559,790 B1* | 5/2003 | Buehler et al. | 342/6 |
| 6,933,807 B2 | 8/2005 | Marksteiner | |
| 6,966,493 B2* | 11/2005 | Hartmann | 235/454 |
| 6,967,428 B2* | 11/2005 | Edmonson et al. | 310/313 D |
| 7,005,964 B2* | 2/2006 | Edmonson et al. | 340/10.1 |
| 7,023,323 B1* | 4/2006 | Nysen | 340/10.1 |
| 7,847,721 B1* | 12/2010 | Carlsson et al. | 342/6 |
| 7,961,077 B2* | 6/2011 | Watanabe et al. | 340/5.8 |
| 8,274,368 B2* | 9/2012 | Yung et al. | 340/10.1 |
| 8,496,184 B2* | 7/2013 | Loi et al. | 235/492 |
| 8,610,545 B2* | 12/2013 | Goh et al. | 340/10.41 |
| 8,710,714 B2* | 4/2014 | Loi et al. | 310/313 R |
| 2001/0048386 A1* | 12/2001 | Edmonson et al. | 342/42 |
| 2006/0244652 A1* | 11/2006 | Tethrake et al. | 342/44 |
| 2008/0223930 A1* | 9/2008 | Rolland et al. | 235/385 |
| 2009/0032590 A1* | 2/2009 | Hopkins | 235/385 |
| 2009/0111602 A1* | 4/2009 | Savarese et al. | 473/283 |
| 2010/0039000 A1 | 2/2010 | Milson | |
| 2010/0182695 A1* | 7/2010 | Benson et al. | 359/529 |
| 2010/0308105 A1* | 12/2010 | Savarese et al. | 235/375 |
| 2011/0012775 A1* | 1/2011 | Richards et al. | 342/146 |

OTHER PUBLICATIONS

Remote Sensing of Physical Parameters by Means of Passive Surface Acoustic Wave Devices ("ID-TAG"), Corporate and Research Development, F. Schmidt, O. Sczesny, L. Reindl, V. Magori, Siemens AG., D-81730 Munich, 1994 Ultrasonics Symposium, pp. 589-592.

\* cited by examiner

Encoded Device – Side View

Encoded Device – Perspective View

APPARATUS AND METHOD FOR ELECTROMAGNETIC WAVE STRUCTURE MODULATION

RELATED APPLICATION

This non-provisional patent application claims the benefit of provisional patent application No. 61/610,175 filed on Mar. 13, 2012, which is incorporated by reference in its entirety.

FIELD

The present disclosure relates to an apparatus and method for electromagnetic wave structure modulation.

DETAILED DESCRIPTION

Figure 1:
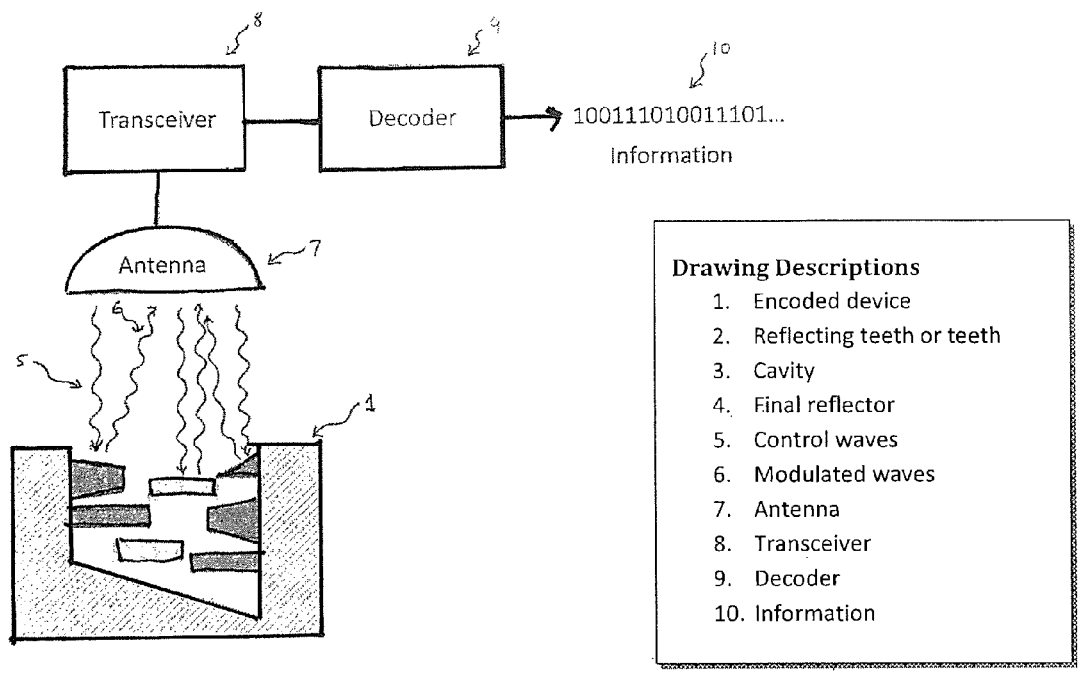
FIG. 1 is a simplified block diagram of an exemplary system and method for electromagnetic wave structure modulation.
Figure 2:
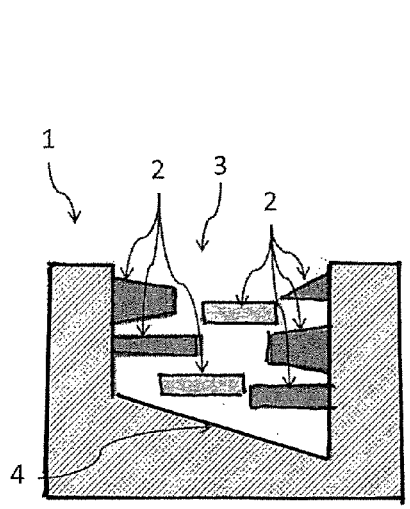
FIG. 2 is a simplified side view of an exemplary system and method for electromagnetic wave structure modulation.
Figure 3:
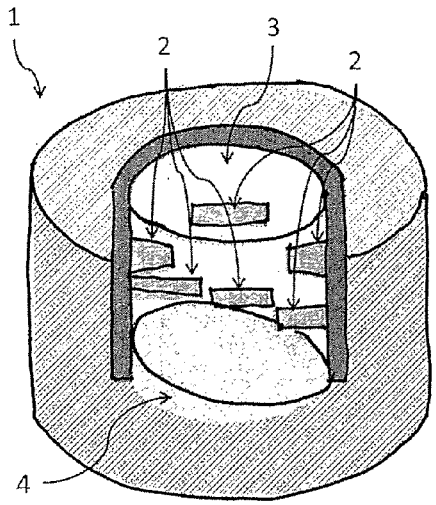
FIG. 3 is a simplified perspective view of an exemplary system and method for electromagnetic wave structure modulation.

Electromagnetic wave structure modulation methodology and apparatus utilizes electromagnetic wave and precisely structured surface irregularity to retrieve encoded information as the control wave pass through the reflecting teeth or teeth and reflected back to the interrogating device. Electromagnetic waves of several frequency ranges may be used: super high frequency (SHF): 3-30 GHz, 100 mm-10 mm $\lambda$, extremely high frequency (EHF): 30-300 GHz, 10 mm-1 mm $\lambda$, and terahertz or tremendously high frequency (THz or THF): 300-3,000 GHz, 1 mm-100 µm $\lambda$.

The apparatus/device includes two key components: (1) encoded device, and (2) interrogating device. The interrogating device includes an antenna, transceiver, and decoder. The encoded device is a passive device with a cavity filled or formed of an electromagnetic wave-transparent material that has three-dimensional electromagnetic wave-opaque encode structures or "teeth," "fingers," and other three-dimensional projections of various shapes and dimensions (length, thickness, width, and position) projecting into the cavity. The cavity also includes a final reflector, having a specific angle. The three-dimensional projections modifies the controlling wave as it enters into the cavity and reflects the modified wave back to the interrogator. The size, depth, and angles of the cavity determine the resonating frequency and phase of the carrier signal upon reflecting back to the interrogating device. The three-dimensional projections within the cavity determine the minor phase shifting, number of reflections, and/or times between reflections within the carrier signal. Both carrier signal and the encoded reflections contain the predetermined information which may be decoded by an interrogating device.

The interrogating device consists of a transceiver and decoder. The transceiver is capable to transmit frequencies within a predetermined frequency range, and to receive reflected encoded signal from the encoded device. The transceiver interrogates the encoded devices by sweeping through predetermined frequency channels and listens to the reflections from the encoded devices. As soon as a reflected signal is detected, the transceiver passes the signal to the decoder for retrieving the encoded information. The transceiver may also utilize the frequency and phase domain of the reflected carrier signals from the encoded devices to perform anti-collision within the same read field. That is, the interrogating device can read multiple encoded devices at once.

The interrogating device transmits control waves by sweeping through frequency channels within a predetermined range. When control wave reach an encoded device which is tuned at the same frequency as the control wave, the control wave enters the encoded device's cavity. As the wave entering the cavity, the teeth modulate the control wave with the encoded device's information. Upon reaching the final reflector of the cavity, the modulated wave reflected back to the interrogating device. The interrogating device receives the signal and decodes the information.

In addition to storing information in encoded devices, the encoded devices can provide temperature and pressure information due to material expansion or contraction. As the material of which the cavity and teeth are made up of expands and contracts, it slightly alters both time and phase domains of the reflected signals.

The features of the present invention which are believed to be novel are set forth below with particularity in the appended claims. However, modifications, variations, and changes to the exemplary embodiments described above will be apparent to those skilled in the art, and the system and method described herein thus encompass such modifications, variations, and changes and are not limited to the specific embodiments described herein.

What is claimed is:

1. Electromagnetic wave structure modulation apparatus, comprising:
   an interrogating device comprising:
      a transceiver operable to transmit a control electromagnetic wave having a certain frequency into an encoded device, the control electromagnetic wave being modulated and reflected by the encoded device;
      an antenna operable to receive the reflected and modulated electromagnetic wave; and
      a decoder coupled to the antenna and configured to decode the received reflected and modulated electromagnetic wave into decoded data; and
   the encoded device tuned to the control electromagnetic wave transmitted by the transceiver comprising:
      a three-dimensional volume formed of a material that is transparent to the control electromagnetic wave transmitted by the transceiver;
      a wall surrounding the three-dimensional volume formed of a material that is opaque to the control electromagnetic wave transmitted by the transceiver; and
      a plurality of three-dimensional structures formed of a material that is opaque to the control electromagnetic wave disposed within the three-dimensional volume, each structure having specific shape, size, and position configured to modulate and reflect the control electromagnetic wave.

2. Electromagnetic wave structure modulation apparatus of claim 1, wherein the encoded device further comprises a final reflector formed of a material that is opaque to the control electromagnetic wave configured to reflect the modulated and reflected electromagnetic wave toward the interrogating device.

3. Electromagnetic wave structure modulation apparatus of claim 1, wherein the three-dimensional structures are configured to alter at least one of time and phase domains of the control electromagnetic wave.

4. Electromagnetic wave structure modulation apparatus of claim 1, wherein the three-dimensional structures comprise a plurality of three-dimensional projections projecting from the wall into the three-dimensional volume of the encoded device.

5. Electromagnetic wave structure modulation apparatus of claim 1, wherein the three-dimensional structures comprise a plurality of projections projecting from the wall into the three-dimensional volume of the encoded device, the shape and size of the projections, and the angular and linear positions of the projections in the three-dimensional volume of the encoded device being configurable to tune the encoded device.

6. An electromagnetic wave structure modulation method, comprising:
  generating and directing a control electromagnetic wave of
    a certain frequency toward an encoded device, the encoded device comprising:
    a three-dimensional volume formed of a material that is transparent to the control electromagnetic wave;
    a wall surrounding the three-dimensional volume formed of a material that is opaque to the control electromagnetic wave; and
    a plurality of structures formed of a material that is opaque to the control electromagnetic wave disposed within the three-dimensional volume, each structure having specific shape, size, and position within the three-dimensional volume configured to modulate and reflect the control electromagnetic wave; and
    a final reflector structure formed within the three-dimensional volume of the encoded device configured to reflect the modulated and reflected electromagnetic wave;
  receiving the reflected and modulated electromagnetic wave from the encoded device;
  converting the received electromagnetic wave to an electrical signal; and
  decoding the electrical signal.

7. A method of forming an electromagnetic wave structure modulation apparatus, comprising:
  forming a three-dimensional volume of a material that is transparent to a control electromagnetic wave with a certain frequency, the three-dimensional volume having a first end and a second end;
  forming a wall surrounding the three-dimensional volume of a material that is opaque to the control electromagnetic wave; and
  forming a plurality of structures of a material that is opaque to the control electromagnetic wave within the three-dimensional volume, each structure having specific shape, size, and position within the three-dimensional volume configured to modulate and reflect the electromagnetic wave in a predetermined way.

8. The method of forming an electromagnetic wave structure of claim 7 further comprising forming a final reflector wall of a material that is opaque to the control electromagnetic wave disposed at the second end of the three-dimensional volume and configured to reflect the electromagnetic wave modulated and reflected by the plurality of structures toward the first end of the three-dimensional volume.

\* \* \* \* \*